Dec. 25, 1928.
J. B. TUCKER
DRAG HANDLE CATCH
Filed Aug. 24, 1927
1,696,461
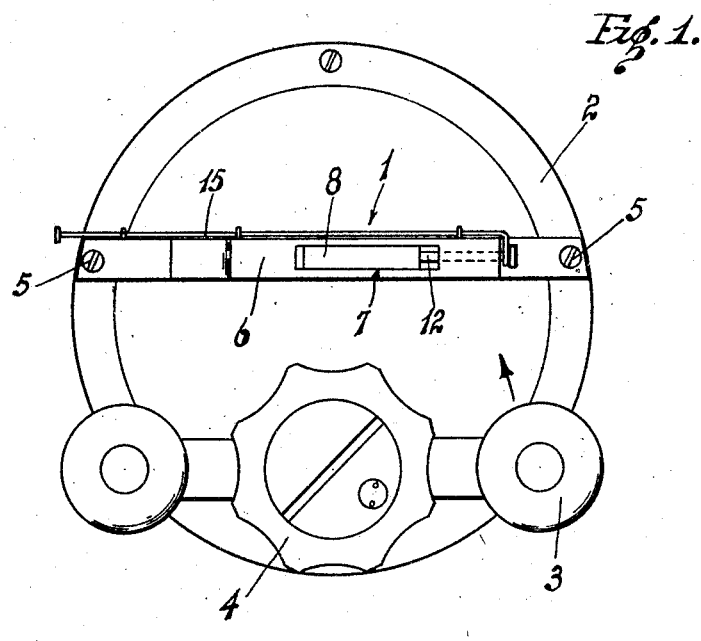
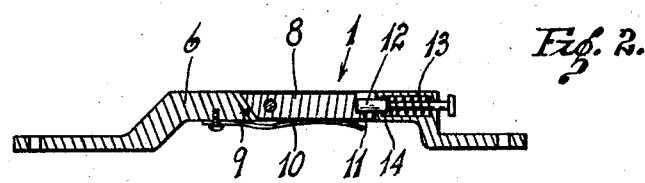
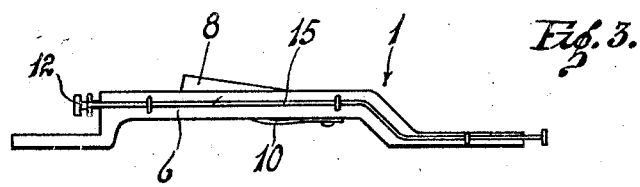
INVENTOR.
JOSEPH B. TUCKER.
BY.
ATTORNEY.

Patented Dec. 25, 1928.

1,696,461

UNITED STATES PATENT OFFICE.

JOSEPH B. TUCKER, OF LONG BEACH, CALIFORNIA.

DRAG-HANDLE CATCH.

Application filed August 24, 1927. Serial No. 215,065.

My drag handle catch is particularly applicable to fishing reels and is arranged to prevent the backward rotation of the handle so that a brake can be applied to the reel to retard the progress of the fish.

An object of my invention is to provide a catch which can be quickly and easily attached to a reel with a minimum expenditure of time and effort.

Another object is to provide a catch which is simple in construction, inexpensive to manufacture, and effective in operation.

Still another object is to provide means whereby the catch can be released into operative position while the handle is being rapidly rotated by the action of the fish.

Other objects, advantages, and features of invention may appear from the accompanying drawing, the subjoined detailed description, and the appended claims.

In the drawing:

Fig. 1 is a plan view of my catch shown in position on the reel.

Fig. 2 is a longitudinal sectional view of the catch.

Fig. 3 is a side elevation of the same.

Referring more particularly to the drawing:

My catch 1 is adapted to be mounted on the side plate 2 of the fishing reel case and is so positioned that the handle 3 will pass over it when revolved. A friction adjusting nut 4 is provided on the handle 3, the construction and arrangement of which is well-known in the art and forms no part of this invention. The drag catch 1 is mounted on the face plate 2 by means of screws 5, 5 which extend through the face plate and are part of the assembly of the reel. Therefore, it is not necessary to tap any special holes or interfere in any way with the mechanism of the reel.

The catch 1 is provided with a raised central section 6 and this section is of sufficient height so that the handle 3 will just clear it during the rotation of the handle. A slot 7 is provided in the section 6 and a dog 8 is pivoted in the slot. The rear end of the dog 8 is tapered, as at 9, so that it will engage the rear face of the slot 7 and limit the upward movement of the dog. A leaf spring 10 is secured to the bottom of the section 6 and bears against the dog 8, thus urging the dog upwardly into the position to engage the handle. A notch 11 is formed in the forward end of the dog 8 to receive a pin 12 which pin extends through the section 6 and projects from the end thereof so that it may be grasped and moved outwardly to release the dog. A spring 13 engages a shoulder 14 on the pin 12 to urge the pin inwardly to the notch 11 to hold the dog depressed.

When the fish is carrying the line outwardly thus rapidly rotating the handle 3 in the direction of the arrow in Fig. 1, it might be quite difficult to grasp the pin 12 in order to release the dog 8 and stop the rotation of the handle. If it is found to be necessary I may provide a rod 15 which is slidably mounted on the side of the catch and engages the head of the pin 12. This rod extends beyond the edge of the face plate 2 where it may be readily grasped and moved by the operator to release the pin 12 and dog 8. The section 6 is positioned immediately below the handle 3 and when the dog 8 springs upwardly to the position shown in Fig. 3, the handle in its rotation will engage the same and be stopped. Then by manipulation of the nut 4 the required brake can be applied to the line which is being carried outwardly by the fish.

It will be evident that if necessary shims may be placed under the catch to raise it so that the section 6 will be positioned a short distance under the handle.

It will be evident from the foregoing description that my catch can be applied to a reel without any expensive machine work or expenditure of time since the screws 5 are already provided on the reel and need only be removed and inserted through the catch to hold the same in position.

Having described my invention, I claim:

1. In a fishing reel having a drag handle thereon, a catch for the drag handle comprising a bar adapted to be secured to the reel, a dog pivotally mounted on the bar, and spring means urging the dog upwardly in position to engage the drag handle.

2. In a fishing reel having a drag handle thereon, a catch for the drag handle comprising a bar adapted to be secured to the reel, a dog pivotally mounted on the bar, spring means urging the dog upwardly in position to engage the drag handle, a pin slidably mounted in the bar and adapted to engage the dog to hold the same depressed, and spring means urging the pin into engaging position.

3. In a fishing reel having a drag handle thereon, a catch for the drag handle comprising a bar adapted to be secured to the reel, a dog pivotally mounted on the bar, spring means urging the dog upwardly in position to engage the drag handle, a pin slidably mounted in the bar and adapted to engage the dog to hold the same depressed, spring means urging the pin into engaging position, a releasing rod engaging said pin and slidably mounted on the bar, said rod extending beyond the edge of the reel.

4. In a fishing reel comprising a drag handle and assembly screws in the periphery thereof, a drag handle catch comprising a bar, said screws being adapted to extend through the bar to mount the same, a central raised section on the bar, said raised section having a slot cut therein, a dog pivotally mounted in the slot, and a leaf spring engaging said dog urging the same upwardly into handle engaging position.

5. In a fishing reel comprising a drag handle and assembly screws in the periphery thereof, a drag handle catch comprising a bar, said screws being adapted to extend through the bar to mount the same, a central raised section on the bar, said raised section having a slot cut therein, a dog pivotally mounted in the slot, and a leaf spring engaging said dog urging the same upwardly into handle engaging position, a pin slidably mounted in the section and adapted to engage the dog to hold the same depressed, and a spring bearing against the pin urging the same into dog engaging position.

6. In a fishing reel comprising a drag handle and assembly screws in the periphery thereof, a drag handle catch comprising a bar, said screws being adapted to extend through the bar to mount the same, a central raised section on the bar, said raised section having a slot cut therein, a dog pivotally mounted in the slot, a leaf spring engaging said dog urging the same upwardly into handle engaging position, a pin slidably mounted in the section and adapted to engage the dog to hold the same depressed, a spring bearing against the pin urging the same into dog engaging position, and a releasing rod slidably mounted on the bar and engaging said pin, said rod protruding beyond the edge of the reel.

In testimony whereof, I affix my signature.

JOSEPH B. TUCKER.